(12) United States Patent
Rosochacki et al.

(10) Patent No.: US 7,485,064 B2
(45) Date of Patent: Feb. 3, 2009

(54) RELEASABLE ENCLOSURE FOR DIFFERENTIAL HOUSING

(75) Inventors: Mike Rosochacki, Canton, MI (US); Brian Nosakowski, Macomb, MI (US)

(73) Assignee: Ronjo Company, Orion, MI (US)

( * ) Notice: Subject to any disclaimer, the term of this patent is extended or adjusted under 35 U.S.C. 154(b) by 241 days.

(21) Appl. No.: 11/363,247

(22) Filed: Feb. 27, 2006

(65) Prior Publication Data

US 2006/0278036 A1    Dec. 14, 2006

Related U.S. Application Data

(60) Provisional application No. 60/656,817, filed on Feb. 25, 2005.

(51) Int. Cl.
*F16H 48/06* (2006.01)

(52) U.S. Cl. ..................................... 475/230

(58) Field of Classification Search ............. 74/606 R, 74/607; 475/230, 220; 29/893.2, 893.1
See application file for complete search history.

(56) References Cited

U.S. PATENT DOCUMENTS

| | | |
|---|---|---|
| 3,679,244 A | 7/1972 | Reddy |
| 4,125,026 A | 11/1978 | Torii et al. |
| 4,183,263 A | 1/1980 | Osenbaugh |
| 4,221,138 A | 9/1980 | Stewart et al. |
| 4,262,766 A | 4/1981 | Brown et al. |
| 4,305,313 A | 12/1981 | Konkle |
| 4,630,506 A | 12/1986 | Allmandinger et al. |
| 4,644,818 A | 2/1987 | Choma et al. |
| 4,722,244 A | 2/1988 | Tsuchiya et al. |
| 4,787,267 A | 11/1988 | Kessler et al. |
| 5,271,294 A | 12/1993 | Osenbaugh |
| 5,286,239 A | 2/1994 | Ito et al. |
| 5,647,814 A | 7/1997 | Krisher |
| 5,706,694 A | 1/1998 | Bhookmohan et al. |
| 5,715,918 A | 2/1998 | Everett et al. |
| 5,938,558 A | 8/1999 | Eybergen et al. |
| 5,980,416 A | 11/1999 | Gafvert |
| 5,980,417 A | 11/1999 | Wopshall |
| 5,987,728 A | 11/1999 | Townsend |
| 6,010,424 A | 1/2000 | Irwin |
| 6,045,479 A | 4/2000 | Victoria et al. |
| 6,053,838 A | 4/2000 | Gage |
| 6,058,805 A | 5/2000 | Merkler |
| 6,061,907 A | 5/2000 | Victoria et al. |
| 6,146,304 A | 11/2000 | Bendtsen |

(Continued)

FOREIGN PATENT DOCUMENTS

CA    2808768 AA    6/2004

(Continued)

*Primary Examiner*—Dirk Wright
(74) *Attorney, Agent, or Firm*—Howard & Howard Attorneys, P.C.

(57) ABSTRACT

The present invention includes a differential housing and a method for forming the differential housing. The method includes the step of cold-working a first housing preform by one of a group consisting of spin-forming or flow-forming the inner surface of the preform into conformance with a contour of a first mandrel to form the differential housing. The method also includes the step of installing a differential mechanism subassembly including a plurality of gears and a pin in the differential housing. The method also includes the step of releasibly connecting a housing portion of the differential housing with one of a lid and a second gear assembly.

26 Claims, 5 Drawing Sheets

U.S. PATENT DOCUMENTS

| | | |
|---|---|---|
| 6,176,152 B1 | 1/2001 | Victoria et al. |
| 6,196,942 B1 | 3/2001 | Peterson et al. |
| 6,210,299 B1 | 4/2001 | Yoshioka |
| 6,256,988 B1 | 7/2001 | Hauser et al. |
| 6,325,737 B1 | 12/2001 | Zinke et al. |
| 6,379,277 B1 | 4/2002 | Victoria et al. |
| 6,497,027 B1 | 12/2002 | Irwin |
| 6,589,671 B1 | 7/2003 | Kehrer |
| 6,616,565 B1 | 9/2003 | Chen |
| 6,623,396 B2 | 9/2003 | Szalony |
| 6,645,113 B2 | 11/2003 | Orr et al. |
| 6,652,408 B2 | 11/2003 | Rutt et al. |
| 6,692,398 B1 | 2/2004 | Sullivan |
| 6,699,154 B2 | 3/2004 | Orr et al. |
| 6,702,707 B2 | 3/2004 | Krzesicki et al. |
| 6,945,898 B2 | 9/2005 | Szuba |
| 6,957,918 B2 | 10/2005 | Beutler |
| 2003/0119621 A1 | 6/2003 | Orr et al. |
| 2003/0144108 A1 | 7/2003 | Krzesicki et al. |
| 2004/0060384 A1 | 4/2004 | Guo |
| 2004/0116235 A1 | 6/2004 | Szuba |
| 2005/0103557 A1 | 5/2005 | Duncan |

FOREIGN PATENT DOCUMENTS

| | | |
|---|---|---|
| EP | 0321435 A2 | 11/1988 |
| EP | 0343146 A2 | 8/1999 |
| WO | WO 0228678 A1 | 4/2002 |
| WO | WO 2004053357 A1 | 12/2003 |

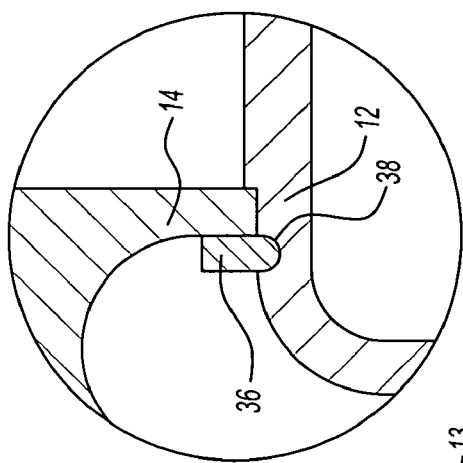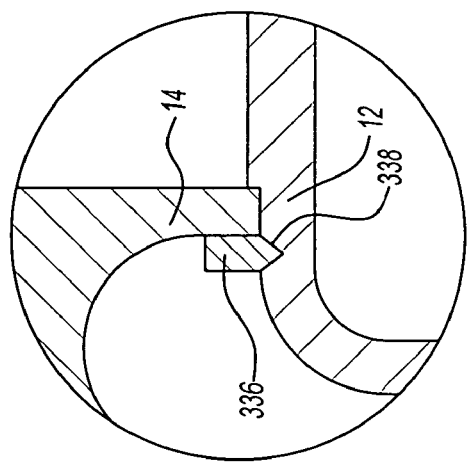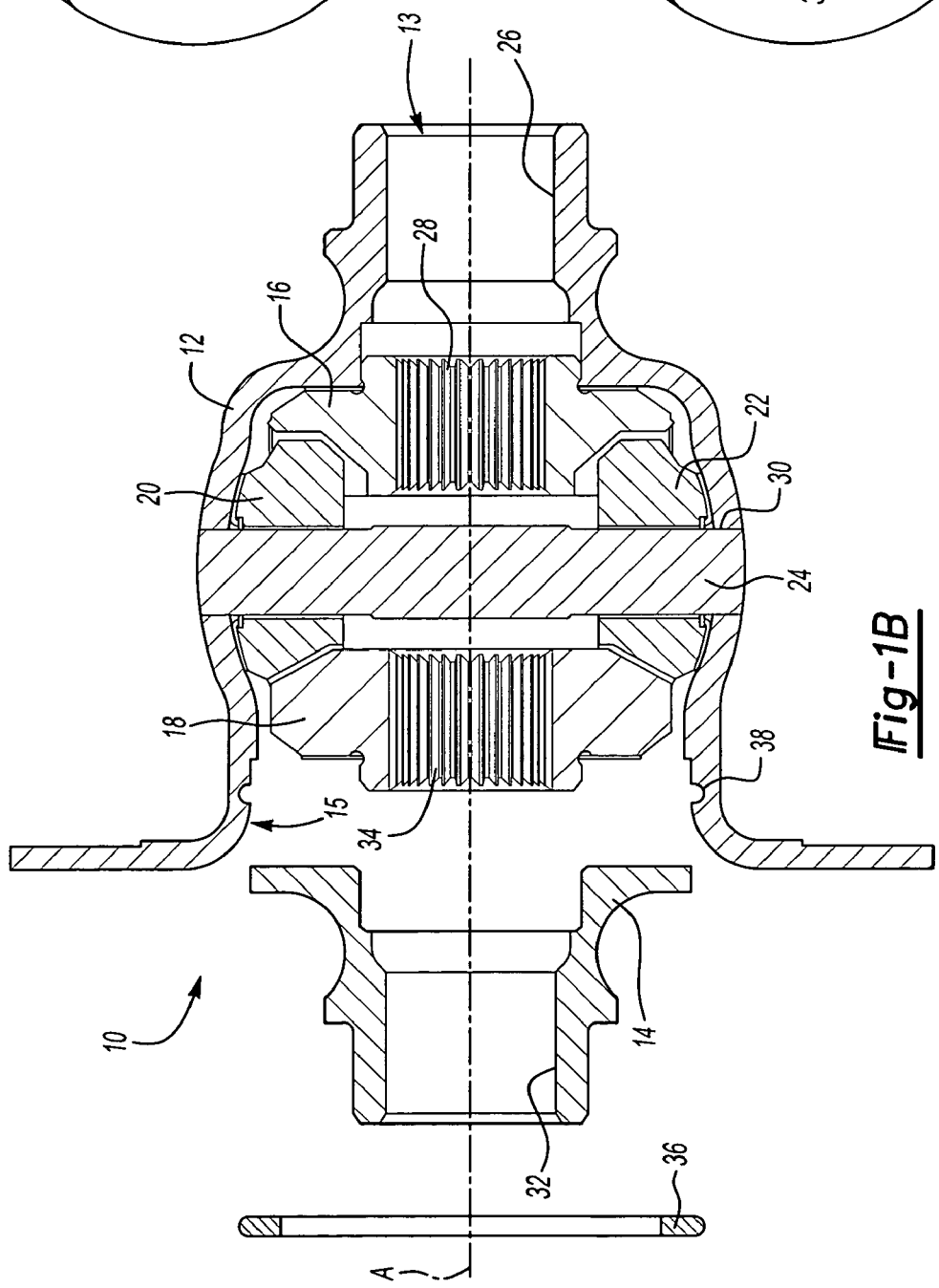

RELEASABLE ENCLOSURE FOR DIFFERENTIAL HOUSING

CROSS-REFERENCE TO RELATED APPLICATIONS

This application claims the benefit of a provisional application Ser. No. 60/656,817 filed on Feb. 25, 2005.

FIELD OF THE INVENTION

The invention relates to an automotive driveline application and in particular to a flow-formed differential housing for supporting a differential mechanism for transmitting torque from a transmission of a vehicle to axle shafts of the vehicle and a method of forming the flow-formed differential housing.

BACKGROUND OF THE INVENTION

A differential housing supports a differential mechanism having gears that transmit torque from a transmission of a vehicle to axle shafts of the vehicle. Generally, bevels gears of the differential mechanism are housed in the differential housing. Alternatively, planetary gears can also be housed in the differential housing. The typical differential mechanism of the vehicle transmission is designed to transmit torque from a transmission output to the opposing axle shafts allowing right and left wheels to rotate at different speeds, particularly important when negotiating a turn. While performing generally the same function, differential mechanism have different dimensional requirements for rear wheel and front wheel drive vehicles. Specifically, differentials intended for use on the front wheel drive vehicles require a beveled and even annular shape in order to compensate for both the smaller packaging area available and to account for the steering characteristics of the front wheels of the vehicle.

Rear wheel drive vehicles are typically larger and require more torque production than the front wheel drive vehicles and include sport utility, pick-ups, and even heavy duty vehicles. Therefore, the rear wheel drive differential is typically dimensioned larger with heavier gauge steel than is a front wheel drive differential. Iron castings presently used to form a housing of a differential requires a large number of machining operations to produce finished parts having the dimensions necessary to provide adequate tolerances to support the gears disposed within the housing.

Given the high torque requirements that is typical of the rear wheel drive vehicle, it is believed that the differential housing should include a more dimensionally stable and durable configuration than what is required of a front wheel drive differential housing. Furthermore, many of the manufacturing drawbacks of cast differential housings have resulted in excessive cost of a typical vehicle transmission.

The art is replete with various designs of the differential housings and methods of forming the differential mechanisms, which are disclosed in the U.S. Pat. Nos. 6,045,479 to Victoria et al; 6,061,907 to Victoria et al; 6,176,152 to Victoria et al.; and 6,379,277 to Victoria et al. Each of the aforementioned United States Patents discloses a method of forming a differential housing using a cold flow-forming process. While the differential housing formed by the process disclosed in these prior art references are believed to be effective for use in a front wheel drive transmission, it is believed that the differential housings will not be as effective for use in a rear wheel drive vehicle. However, the dimensional improvements produced by the cold flow-forming process that enable sheet steel to be used to form the differential housing can also be used to form a differential housing for a rear wheel drive differential. Therefore, the cold flow-forming process disclosed in these prior art patents are included by reference herein.

The differential housings, as disclosed in the aforementioned prior art references, are formed from a single casting that is machined subsequent to casting. In particular, a housing portion is formed in a series of steps starting with a cup-shaped workpiece. The cup-shaped workpiece is fitted over a chuck and flow-formed into a housing preform. Operations such drilling and surface finishing are performed on the housing preform subsequent to the flow-forming process. Gears are placed in the differential housing and the housing is permanently sealed. After being sealed, the entire assembly cannot be serviced and must be replaced if one of the internal components fails.

There is a constant need in the area of differential housings, formed by the cold flow-forming process and by forging and the like, for an improved design of the differential housing that is easily disassembled and is easily serviceable in a short period of time, particularly when one or more of the gears need to be replaced without having to replace the entire differential housing.

SUMMARY OF INVENTION

A differential housing of the present invention is designed for supporting a differential mechanism having a pin, a pair of axle shafts, i.e. the shafts, and a set of gears, such as pinion gears and beveled gears, disposed on the axle shafts and the pin and presenting driving engagement therebetween for transmitting torque from a transmission of a vehicle to the shafts. The shafts and the gears are disposed in the differential housing. A housing portion of the differential housing is defined by an annular wall circumscribing an axis. The annular wall is exposed to an open end for receiving one of the shafts. The annular wall is further exposed to an open front being opposite from the open end. A lid or a secondary gear assembly of the differential housing is attached to the open front thereby forming an enclosure within the housing portion for engaging the shafts and the gears therein. A locking device defined by a snap-ring extends peripherally about the housing portion at the open front. The snap-ring is elastically deformed between a stressed position and an unstressed position for releasibly connecting the lid to the housing portion for forming the enclosure within the housing portion to support the differential mechanism and for selectively removing the shafts and the gears of the differential mechanism from the enclosure when the snap-ring is in the stressed position as the lid is removed from the engagement with the housing portion.

An inventive method of forming the aforementioned differential housing includes the step of cold-working a first housing preform by one of a group consisting of spin-forming or flow-forming the inner surface of the preform into conformance with a contour of a first mandrel to form a differential housing. The method also includes the step of installing a differential mechanism subassembly including the aforementioned plurality of gears and a pin in the differential housing. The method also includes the step of releasibly connecting the housing portion of the differential housing with one of a lid and a secondary gear assembly.

One of the advantages of the present invention is that the releasable connection between the lid or the secondary gear assembly and the housing portion of the differential housing allows the differential housing to be easily serviced. For example, one or more of the gears can be replaced without having to replace the entire differential housing, which is required of prior art differential housings formed by cold working.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1B is a partially exploded view of the first exemplary embodiment of the differential housing;

FIG. 1C is a fragmental view of a housing portion and a lid of the differential housing with the lid connected to the housing portion by a snap-ring having a beveled peripheral edge;

FIG. 1D is a fragmental view of the housing portion and the lid connected by a snap-ring having a V-shaped or tapered peripheral edge;

DETAILED DESCRIPTION OF THE INVENTION

Figure 1A:
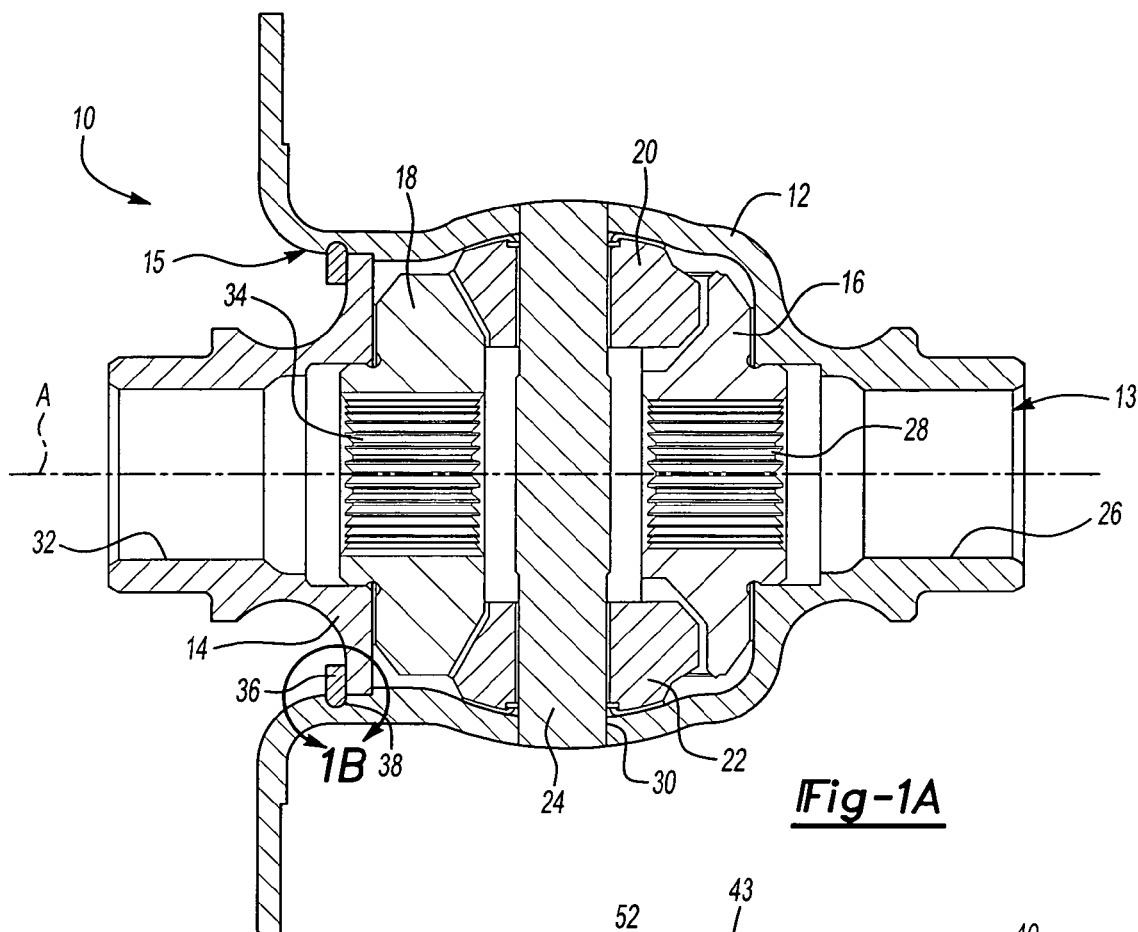
FIG. 1A is a cross-sectional view of a first exemplary embodiment of a differential housing of the present invention.
Figure 2:
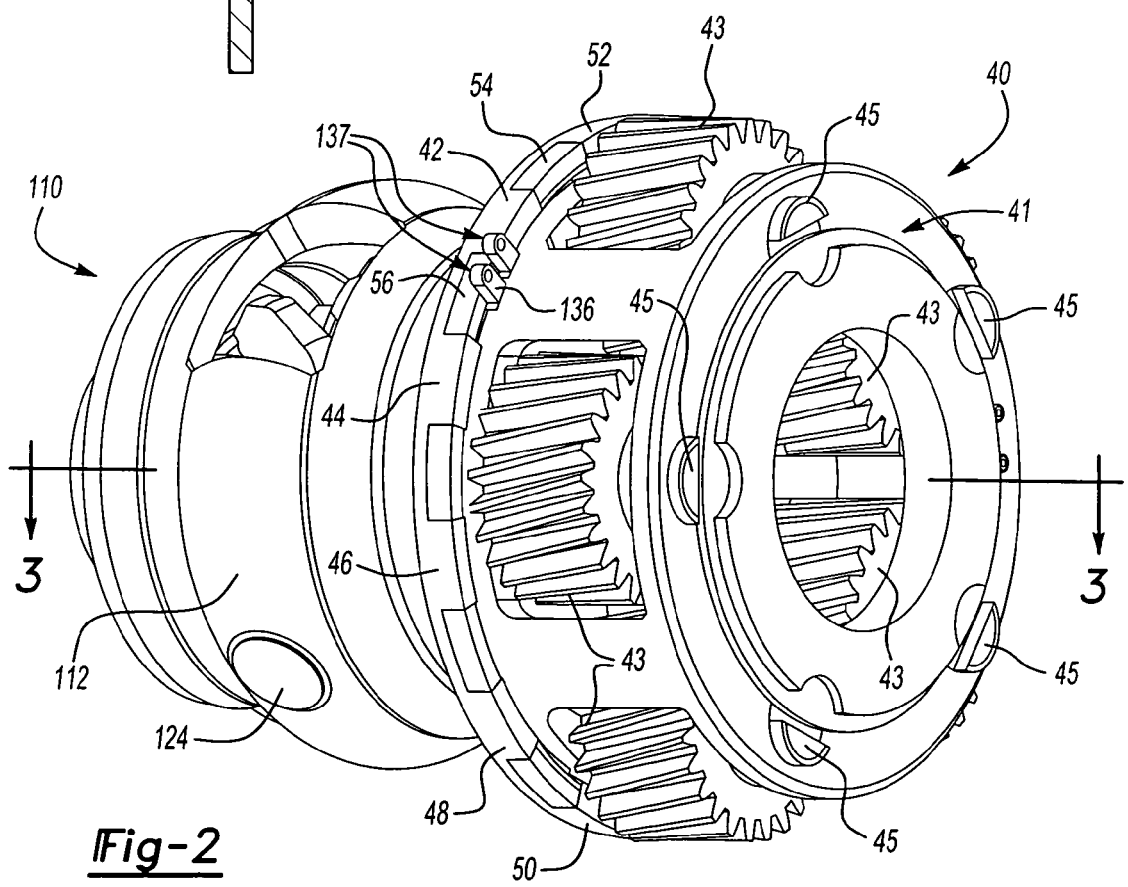
FIG. 2 is a perspective view of a second exemplary embodiment of the differential housing.

A differential housing assembly 10 of the present invention is designed for supporting a differential mechanism or differential mechanism subassembly (to be discussed in details further below) for transmitting torque from a transmission of a vehicle (not shown) to axle shafts (not shown) of the differential mechanism of the vehicle. Plurality of different embodiments of the invention are shown in the Figures of the application. Similar features are shown in the various embodiments of the invention. Similar features have been numbered with a common two-digit reference numeral and have been differentiated by a third digit placed before the two common digits. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

Referring now to FIG. 1, in a first exemplary embodiment of the invention, the differential housing assembly 10 includes a differential housing or housing portion 12 and a lid 14. The differential housing 12 is formed according the cold forming process set forth in the U.S. Pat. No. 6,061,907 to Victoria et al., which is hereby incorporated by reference in its entirety. The housing portion 12 is defined by an annular wall circumscribing an axis A with the annular wall exposed to an open end, generally indicated at 13, for receiving one of the shafts and an open front, generally indicated at 15, opposite from the open end 13. The lid 14 is releasibly engaged with the differential housing 12.

The differential mechanism of the differential housing assembly 10 also includes gears 16, 18, 20, 22 and a pin 24 presenting driving or meshing engagement therebetween. After the differential housing 12 has been formed according to the cold forming process set forth in the U.S. Pat. No. 6,061,907 to Victoria et al., a longitudinal aperture 26 is formed and finished. The longitudinal aperture 26 receives a shaft (not shown. The shaft defines splines (not shown) which matingly engage splines 28 defined by the gear 16. Also, a transverse aperture 30 is formed and finished. The transverse aperture 30 passes through the differential housing 12. The pin 24 is received in the transverse aperture 30. The lid 14 is releasibly associated with the differential housing 12 after the gears 16, 18, 20, 22 have been assembled and inserted into the differential housing 12. The lid 14 defines a second longitudinal aperture 32 which receives a second shaft (not shown). The second shaft defines splines (not shown) which matingly engage splines defined by the gear 18.

The lid 14 and the differential housing 12 are releasibly engaged with respect to one another with a locking device such as, for example a snap-ring 36 extending into a groove 38 defined in the differential housing 12. The snap-ring 36 extends peripherally about the inner surface of the differential housing 12 at the open front 15. The snap-ring 36 is elastically deformed between a stressed position and an unstressed position to remove the lid 14 from the differential housing 12 and to connect the lid 14 to the differential housing 12, respectively. When the snap-ring 36 is disengaged from the groove 38, the lid 14 is removed from the differential housing 12 to allow a technician (not shown) to remove the differential mechanism from the enclosure to replace one or all of the gears 16, 18, 20, 22. When the differential mechanism is serviced, the technician re-connects the lid 14 with the differential housing 12 as the snap-ring 36 is moved the stressed position to the unstressed position as the snap-ring 36 is radially retracted, disposed over the lid 14 and then allowed to radially expand from the stressed position to the unstressed position with the snap-ring 36 engaging the groove 38 to form the enclosure within the differential housing 12. The releasable connection between the lid 14 and the differential housing 12 allows the differential housing 12 of the differential assembly 10 to be easily serviced in a short period of time. For example, one or more of the gears 16, 18, 20, 22 can be replaced without having to replace the entire differential housing assembly 10.

As best illustrated in FIGS. 1C and 1D the snap-ring 36 and the respective peripheral groove 38. In one embodiment, as illustrated in FIG. 1C, the snap-ring 36 extends to a peripheral edge having a beveled configuration. The peripheral groove 38 presents a configuration to complement the beveled configuration of the snap-ring 36. FIG. 1D illustrates an alternative embodiment of a snap-ring 336 having a tapered or a V-shaped peripheral edge to complement with a V-shaped groove 338 defined in the differential housing 12. Those skilled in the mechanical art will appreciate that other configurations of the snap-ring 34 and the peripheral groove may be utilized in practicing the invention.

Referring now to FIGS. 2-5, in a second exemplary embodiment of the invention, a differential housing assembly 110 includes a differential housing 112 and a secondary gear assembly 40. The secondary gear assembly 40 includes a support housing 41 and a plurality of secondary gears 43 rotatably supported 45 by the support housing 41. The support housing 41 extends to a peripheral edge 47 that abuts the differential housing 112. The differential housing assembly 110 also includes gears 116, 118, 120, 122 and a pin 124. After the differential housing 112 has been formed according to the cold forming process set forth in the U.S. Pat. No. 6,061,907 to Victoria et al., a longitudinal aperture 126 is formed and finished. The longitudinal aperture 126 receives a shaft. The shaft (not shown) defines splines which matingly engage splines 128 defined by the gear 118. Also, a transverse aperture 130 is formed and finished. The transverse aperture 130 passes through the differential housing 112. The pin 124 is received in the transverse aperture 130.

Figure 5:
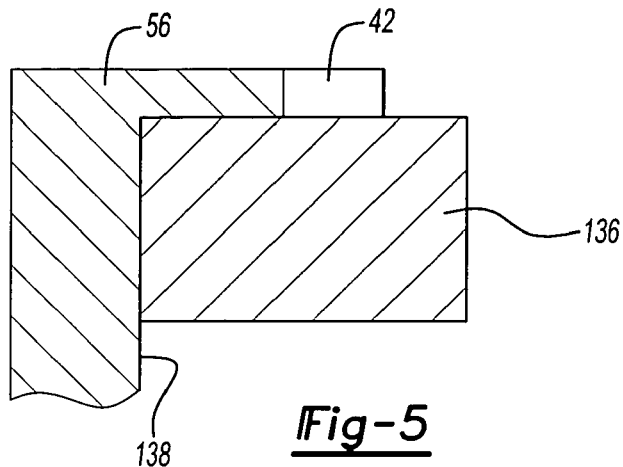
FIG. 5 is a cross-sectional view taken along section lines 5-5 in FIG. 4.

The differential housing 112 and the secondary gear assembly 40 defining mating castle-teeth. For example, the differential housing 112 forms first connectors such as castle teeth 42, 44, 46, 48, 50, 52 and the secondary gear assembly 40 forms second connectors such as castle teeth 54, 56. The castle teeth 42, 44, 46, 48, 50, 52, 54, 56 engage one another to prevent relative rotation between the differential housing 112 and the secondary gear assembly 40. As shown in FIG. 5, the castle teeth, such as castle-tooth 42, of the differential housing 112 extend radially inward greater than the castle teeth, such as castle-tooth 56, of the secondary gear assembly 40.

Figure 3:
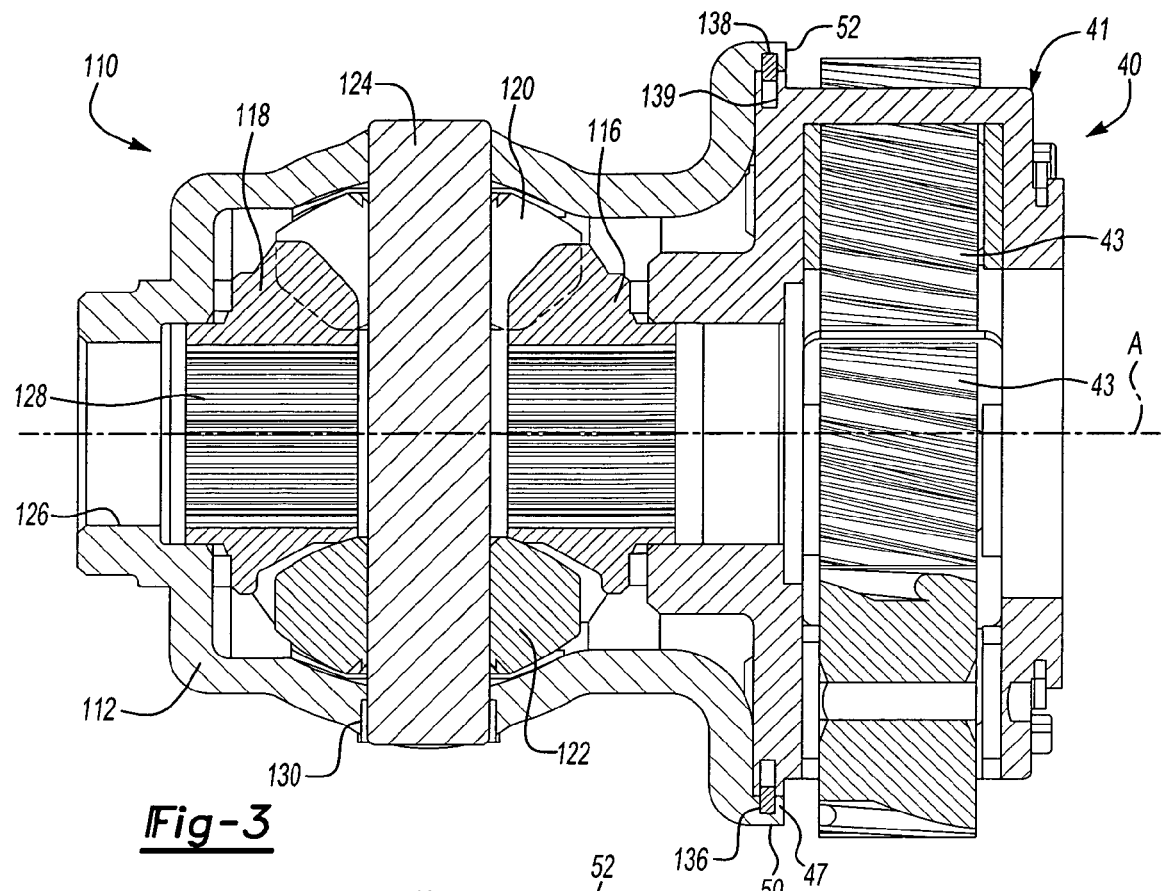
FIG. 3 is a cross-sectional view taken along section lines 3-3 in FIG. 2.
Figure 4:
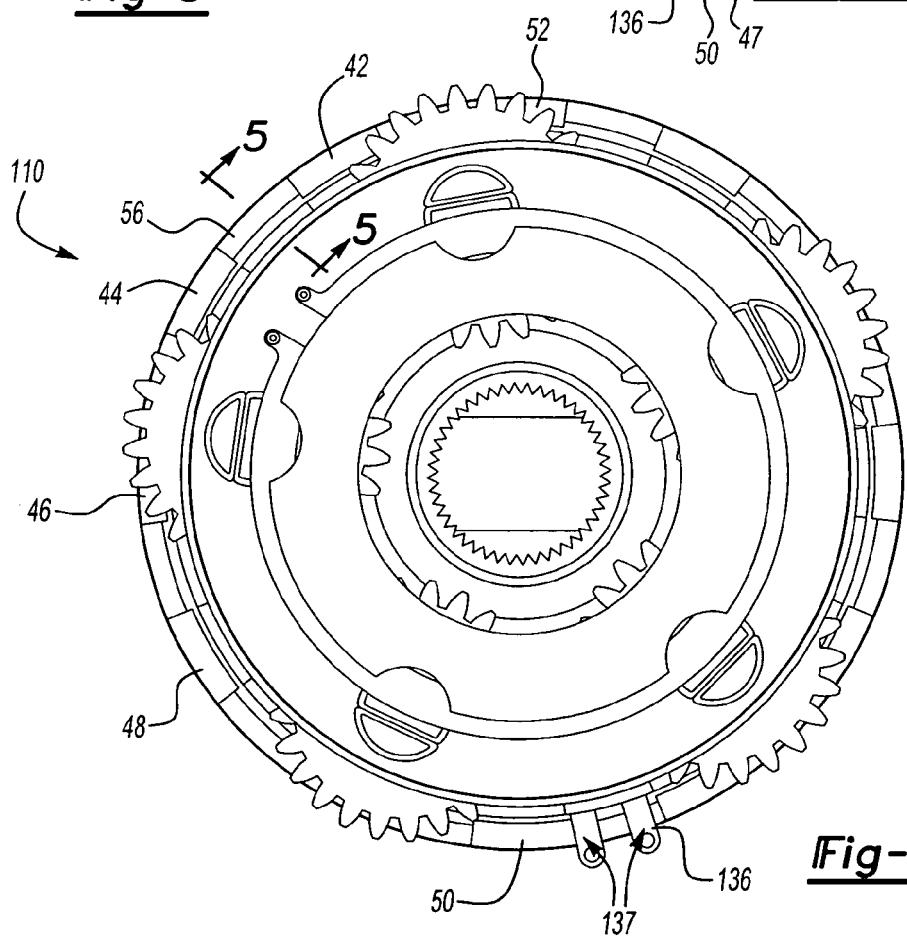
FIG. 4 is right-hand view of the second exemplary embodiment of the differential housing.

The differential housing 112 and the secondary gear assembly 40 are releasibly engaged with one other with a snap-ring 136 terminated into fingers 137 adaptable to be engaged by the technician in a manner known to those skilled in the art to manipulate the snap-ring 136 between the stressed and unstressed positions. The secondary gear assembly 40 includes a peripheral notch 139 defined in the peripheral edge 47 of the support housing 41 to form a clearance for the snap-ring 136 as will be discussed further below. The thickness of the peripheral edge 47 and the size of the peripheral notch 139, as shown in FIG. 3, may vary and are not intended to limit the present invention. The snap-ring 136 is releasibly associated with the differential housing 112 after the gears 116, 118, 120, 122 have been assembled and inserted into the housing 12. The mandrel used in the cold forming process used to form the differential housing 112 can include an annular projection so that the differential housing 112 is formed with an annular groove 138. When the snap-ring 136 is disengaged from the groove 138 and disposed in the peripheral notch 139, the secondary gear assembly 40 is removed from the differential housing 112 to allow the technician to remove the differential mechanism from the enclosure to replace one or all of the gears 116, 118, 120, 122. When the differential mechanism is serviced, the technician re-connects the secondary gear assembly 40 with the differential housing 112 as the snap-ring 136 is moved the stressed position, i.e. out from the peripheral notch 139 to the unstressed position as the snap-ring 136 is radially retracted to the groove 138 with the snap-ring 136 engaging the groove 138 to form the enclosure within the differential housing 112 after the secondary gear assembly 40 is placed over the gears 116, 118, 120, 122. The releasable connection, i.e. the snap-ring 136, between the secondary gear assembly 40 and the differential housing 112 allows the differential housing assembly 110 to be easily serviced. For example, one or more of the gears 116, 118, 120, 122 are replaceable without having to replace the entire differential housing assembly 110.

Figure 6:
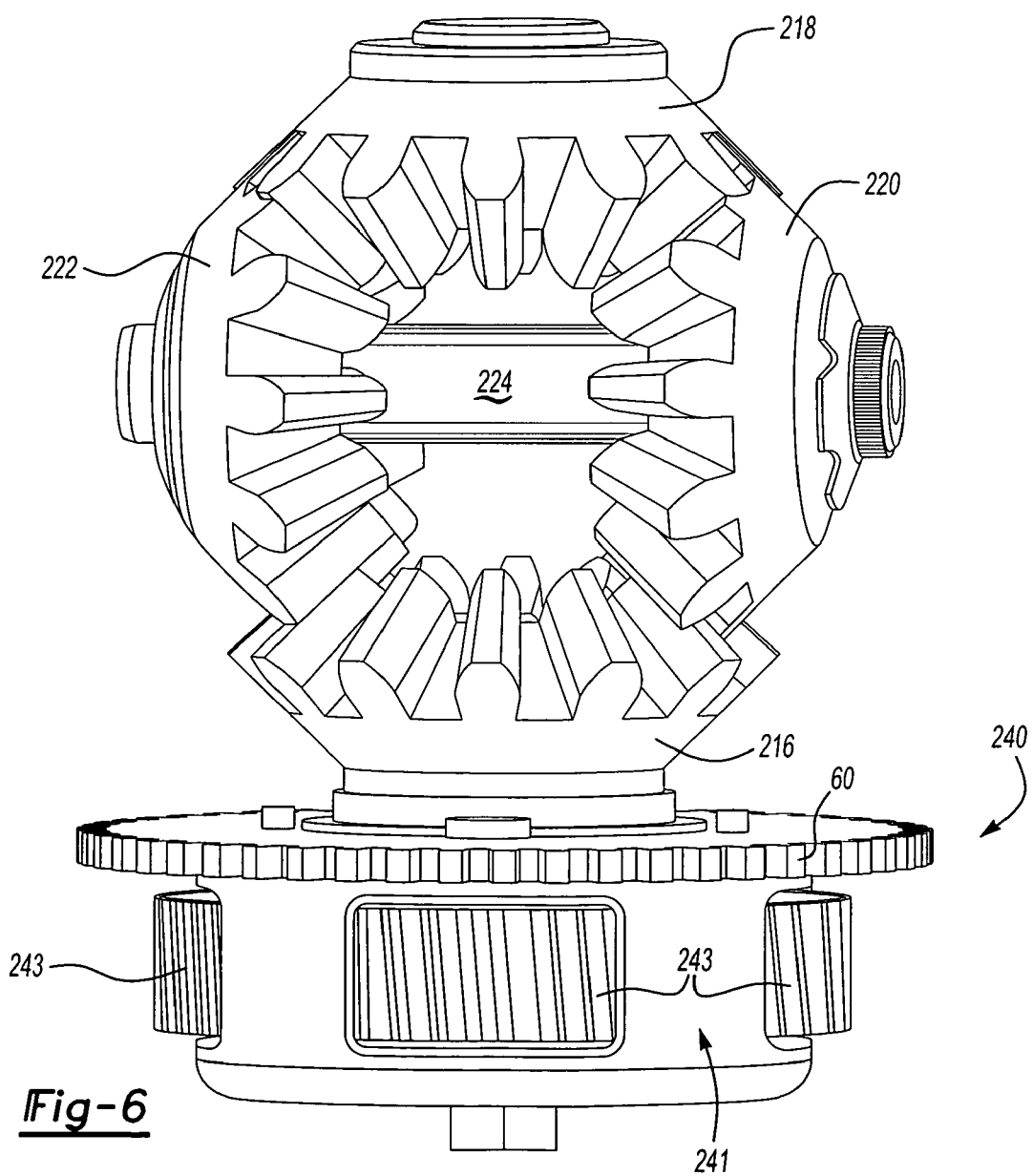
FIG. 6 is a perspective view of the a gear assembly received in differential housing according to a third exemplary embodiment of the present invention.
Figure 7:
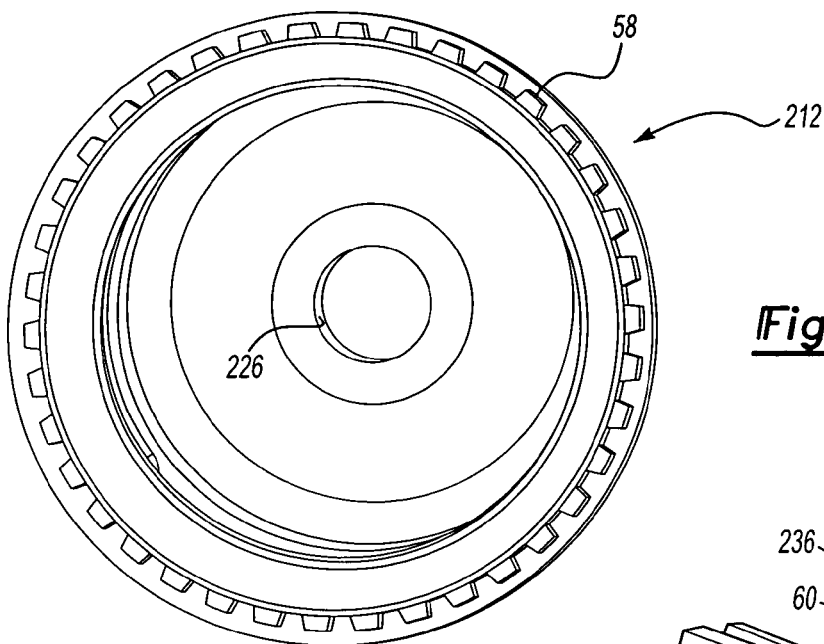
FIG. 7 is a perspective view of the differential housing according to the third exemplary embodiment of the present invention.
Figure 8:
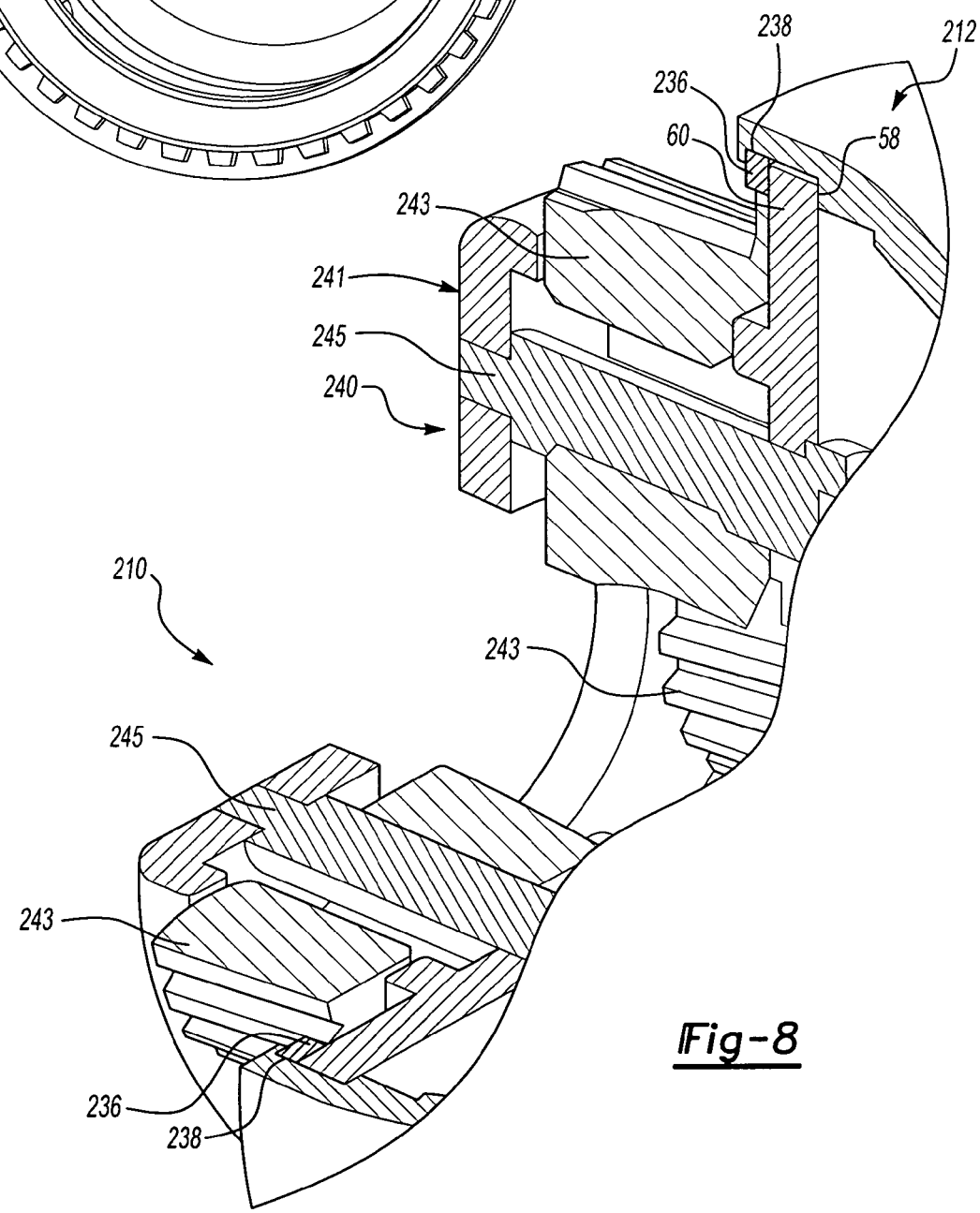
FIG. 8 is a cut-away view showing the gear assembly and differential housing of the third exemplary embodiment of the present invention engaged with respect to one another.

Referring now to FIGS. 6-8, in a third exemplary embodiment of the invention, a differential housing assembly 210 includes a differential housing 212 and a secondary gear assembly 240. The secondary gear assembly 240 includes a support housing 241 and a plurality of secondary gears 243 rotatably supported 245 by the support housing 241. The differential housing assembly 210 also includes gears 216, 218, 220, 222 and a pin 224. After the differential housing 212 has been formed according to the cold forming process set forth in U.S. Pat. No. 6,061,907 to Victoria et al., a longitudinal aperture 226 is formed and finished. The longitudinal aperture 226 receives a shaft (not shown). The shaft defines splines (not shown) which matingly engage splines (not shown) defined by the gear 218. Also, a transverse aperture (not shown) is formed and finished. The transverse aperture passes through the differential housing 212. The pin 224 is received in the transverse aperture.

The differential housing 212 defines a plurality of notches, such as notch 58, and the secondary gear assembly 240 defines a plurality of teeth, such as tooth 60. The teeth and notches engage one another and cooperate to prevent relative rotation between the differential housing 212 and the secondary gear assembly 240.

The differential housing 212 and the secondary gear assembly 240 are releasibly engaged with one other with a snap-ring 236. The functional characteristics of the snap-ring 236 are identical to the functional characteristics of the snap-ring 36 and 136. The secondary gear assembly 240 is releasibly associated with the differential housing 212 after the gears 216, 218, 220, 222 have been assembled. The mandrel used in the cold forming process used to form the differential housing 212 can include an annular projection so that the differential housing 212 is formed with an annular groove 238. After the secondary gear assembly 240 is placed over the gears 216, 218, 220, 222, the snap-ring 236 is radially retracted, disposed over the secondary gear assembly 240 and then allowed to radially expand into the groove 238. The releasable connection between the secondary gear assembly 240 and the differential housing 212 allows the differential housing assembly 210 to be easily serviced. For example, one or more of the gears 216, 218, 220, 222 are replaceable without having to replace the entire differential housing assembly 210. Those skilled in the art will appreciate that the locking device, i.e. the snap-ring 36 of the present invention is not intended to be limited to differential housing assembly formed by the cold forming process and may be utilized by other forger or iron casted differential housing assemblies.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for forming a differential housing assembly comprising the steps of:

cold-working a first housing preform by one of a group consisting of spin-forming or flow-forming the inner surface of the preform thereby forming a differential housing;

mating a differential mechanism subassembly including a plurality of gears retained in meshing engagement by a pin with the differential housing; and releasibly connecting the differential housing with one of a lid and a second gear assembly thereby retaining the differential mechanism subassembly inside the differential housing.

2. The method of claim 1 wherein said cold-working step includes the step of:
forming an annular groove in an interior surface of the differential housing.

3. The method of claim 2 wherein said releasibly connecting step includes the steps of:
positioning a first portion of the lid or second gear assembly on a first side of the annular groove; and
positioning a second portion of the lid or second gear assembly on a second side of the annular groove.

4. The method of claim 3 wherein said releasibly connecting step includes the step of:
disposing an elastically deformed locking device in the annular groove after both of said positioning steps.

5. The method of claim 1 wherein said cold-working step includes the step of:
forming a plurality of castle-teeth in the differential housing.

6. The method of claim 5 including the step of:
forming a plurality of castle-teeth in the lid or second gear assembly.

7. The method of claim 6 wherein said releasibly connecting step includes the step of:
engaging the castle-teeth in the differential housing with the castle-teeth in the lid or second gear assembly thereby enclosing the differential housing.

8. The method of claim 7 wherein said cold-working step includes the step of:
forming an annular groove in an interior surface of the castle-teeth in the differential housing.

9. The method of claim 8 including the step of:
forming an annular groove in an interior surface of the castle-teeth in the lid or second gear assembly.

10. The method of claim 9 wherein said releasibly connecting step includes the step of:
disposing a snap-ring in the annular groove of the castle-teeth in the lid or second gear assembly and in the annular groove of the castle-teeth in the differential housing.

11. The method of claim 1 wherein said cold-working step includes the step of:
forming a plurality of notches in an interior surface of the differential housing.

12. The method of claim 11 including the step of:
forming a plurality of teeth in the lid or second gear assembly.

13. The method of claim 12 wherein said releasibly connecting step includes the step of:
inserting each of the plurality of teeth in one of the plurality of notches.

14. The method of claim 13 wherein said cold-working step includes the step of:
forming an annular groove in the notches in the differential housing.

15. The method of claim 14 including the step of:
forming an annular groove in an interior surface of the teeth in the lid or second gear assembly.

16. The method of claim 15 wherein said releasibly connecting step includes the steps of:
positioning a first portion of the lid or second gear assembly on a first side of the annular groove in the notches in the differential housing; and
positioning a second portion of the lid or second gear assembly on a second side of the annular groove in the notches in the differential housing.

17. The method of claim 16 wherein said releasibly connecting step includes the step of:
disposing a snap-ring in the annular groove of the teeth in the lid or second gear assembly and in the annular groove of the notches in the differential housing.

18. A differential housing for holding the differential mechanism, said differential housing comprising:
a differential gear assembly having a housing cold-worked from metal with a continuous wall and a pin extending through said housing, said housing extending to an open front;
a lid releasibly engageable with said continuous wall to selectively close said housing, said lid and said housing further comprising mating interlocking teeth thereby preventing said lid and said housing from moving relative to one another; and
a locking device extending peripherally around said continuous wall at said open front and being elastically deformed between a stressed position and an unstressed position for releasibly connecting said lid to said housing for removably retaining the differential mechanism in said enclosure.

19. A differential housing for retaining a differential mechanism having a pair of axle shafts and a plurality of gears comprising;
an annular wall circumscribing an axis and exposed to an open end for receiving one of the axle shafts and an open front opposite from said open end,
a secondary gear assembly attachable to said annular wall at said open front defining an enclosure for retaining the differential mechanism therein; and
a locking device extending peripherally wound said annular wall at said open front and being elastically deformed between a stressed position and an unstressed position for releasibly connecting said secondary gear assembly to said annular wall for removably retaining the differential mechanism in said enclosure.

20. A differential housing as set forth in claim 19 wherein said locking device is further defined by a peripheral groove formed in said annular wall at said open front.

21. A differential housing as set forth in claim 20 wherein said locking device includes a snap-ring extending to a peripheral edge disposed in said peripheral groove with said snap-ring extending radially outwardly from said peripheral groove to said axis for holding said secondary gear assembly in frictional engagement with said housing portion as said snap-ring is in said unstressed position thereby preventing longitudinal movement of said secondary gear assembly relative said housing portion.

22. A differential housing as set forth in claim 21 wherein said annular wall includes a plurality of first connectors defined at said open front of said annular wall.

23. A differential housing as set forth in claim 22 wherein said secondary gear assembly is further defined by a support frame and a plurality of secondary gears rotatably supported by said support frame.

24. A differential housing as set forth in claim 23 wherein said support frame includes a plurality of second connectors extending therefrom with said plurality of first connectors and second connectors cooperable with one and the other to prevent relative rotational movement between said annular wall and said secondary gear assembly.

25. A differential housing assembly for a vehicle comprising;
an annular wall circumscribing an axis and exposed to an open end and an open front spaced from said open end;
a lid attached to said open front thereby forming an enclosure within said annular wall, said lid is further defined by a support frame and a plurality of secondary gears rotatably supported by said support frame;

a differential mechanism retained in said enclosure, said differential mechanism includes at least a pair of axle shaft and a set of beveled gears disposed on said axle shafts and a pin and a set of pinion gears disposed on said pin with said beveled gears and said pinion gears presenting driving engagement therebetween;

a locking device extending peripherally around said annular wall at said open front and being elastically deformed between a stressed position and an unstressed position for releasibly connecting said lid to said annular wall for removably retaining said differential mechanism in said enclosure, said locking device being further defined by a groove formed in said annular wall at said open front; and a snap-ring extending to a peripheral edge disposed in said groove with said snap-ring extending radially outwardly from said groove to said axis for holding said lid in frictional engagement with said housing portion as said snap-ring is in said unstressed position thereby preventing longitudinal movement of said lid relative said annular wall.

26. A differential housing assembly as set forth in claim 25 wherein said support frame includes a peripheral notch defined therein with said peripheral notch aligned with said groove to form a clearance for said snap-ring as said snap-ring is in said stressed position.

* * * * *